Patented June 19, 1951

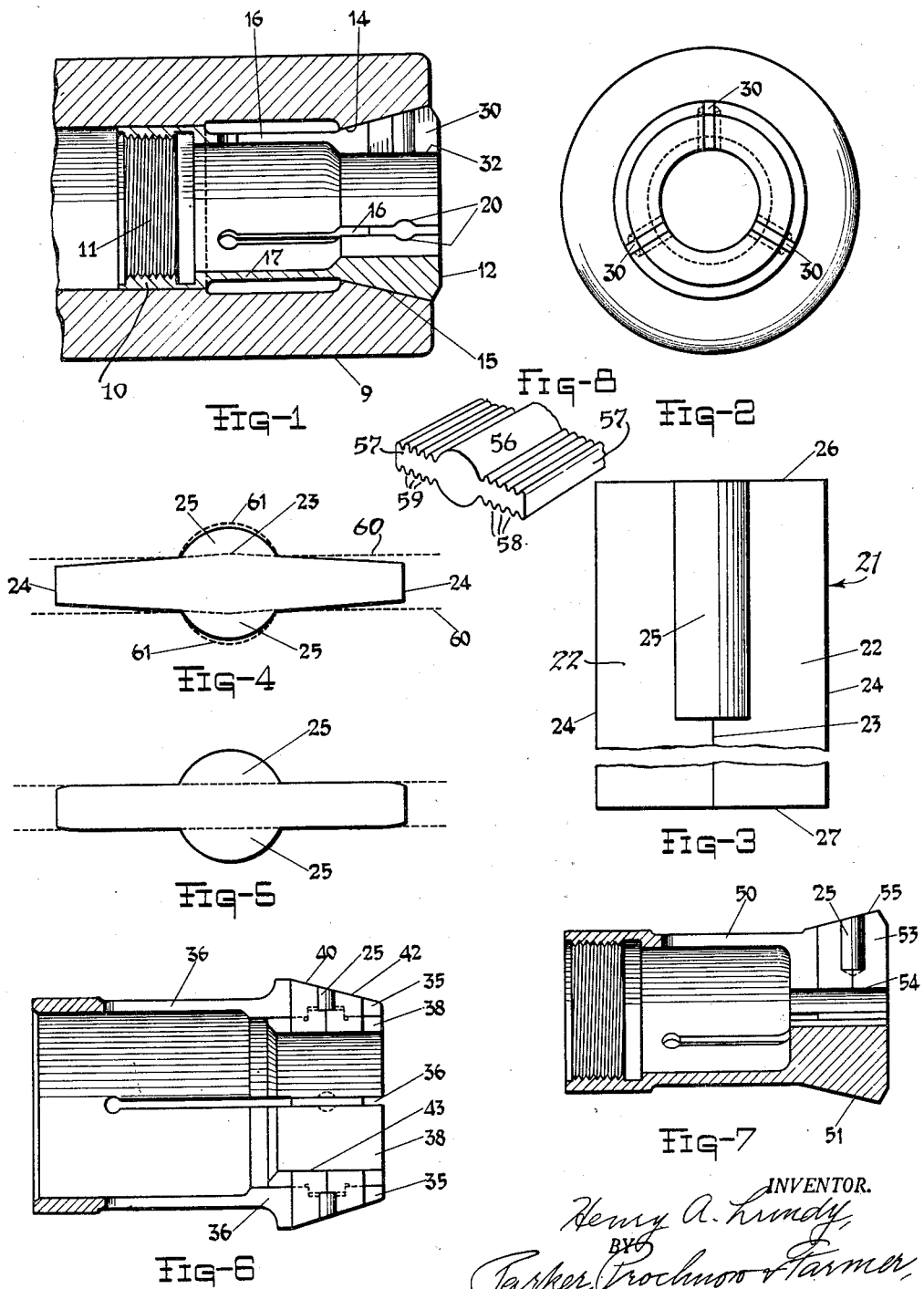

2,557,301

UNITED STATES PATENT OFFICE 2,557,301

SEAL FOR CHUCKS OR COLLETS

Henry A. Lundy, Elmira, N. Y., assignor to
Hardinge Brothers, Inc., Elmira, N. Y.

Application November 1, 1946, Serial No. 707,285

12 Claims. (Cl. 279—46)

This invention relates to improvements in seals for collets or chucks such as used for gripping the work or a tool to operate on the work.

Chucks or collets of this kind are commonly used on lathes, screw machines, and other machines in which a cooling or cutting liquid is employed to cool the cutting tool and the work. This liquid frequently splashes into the chuck or collet and carries particles of the material which is being worked on between the jaws of the collet where it may interfere with the gripping of the work, and seals have heretofore been employed between the jaws of the collet to exclude foreign material therefrom.

One of the objects of this invention is to provide a seal of improved and more efficient and reliable construction for use between the jaws of a collet or chuck to exclude foreign material therefrom. It is also an object of this invention to provide seals of this kind which are firmly held in the collet or chuck so that they will not become dislocated during the opening and closing movements of the jaws of the chuck or by the feeding of the work through the same. A further object of this invention is to provide seals of this type made of a material in the nature of rubber, and which seals are so formed that they exclude foreign matter when the jaws of the collet or chuck are open as well as when they are closed. A further object of this invention is to provide seals of such form as to require the minimum of deformation or flow of the material of the seals when the jaws move from open to closed positions, thereby providing for long life of the seals.

A further object of this invention is to provide seals of an elastic material in the nature of rubber which serve the further purpose of exerting pressure on the jaws of the chuck or collet in a direction to open the same, and thus augment the action of the spring fingers of the chuck or collet.

Other objects and advantages of this invention will appear from the following description and claims.

In the accompanying drawings, which illustrate by way of example several embodiments of my invention:

Fig. 1 is a longitudinal central sectional view of a collet or chuck provided with seals embodying this invention.

Fig. 2 is an end view thereof.

Fig. 3 is a face view of a strip of material for use in connection with the making of seals for chucks or collets.

Fig. 4 is an enlarged edge view of a seal embodying this invention showing the same in position between the jaws of a collet when the same are in open position.

Fig. 5 is a view similar to Fig. 4, showing the seal when the jaws are in closed position.

Fig. 6 is a central sectional elevation of a collet of a different construction and showing my improved seal positioned therein.

Fig. 7 is a central sectional elevation of another chuck or collet showing my improved seal arranged therein.

Fig. 8 is a perspective view of a seal of modified construction.

My improved seal may be employed with collets or chucks of many different types, and in Figs. 1 and 2, I have shown a conventional type of collet arranged in a spindle 9 of a lathe or other machine, the collet including a substantially cylindrical portion 10 which may be secured by any suitable means, such as threads 11, to the usual collet draw tube (not shown) by means of which the collet is moved back and forth for opening and closing the work gripping jaws 12 thereof, the lathe spindle 9 having a frusto-conical bore 14 at the end thereof with which the inclined faces 15 of the jaws of the collet may engage. The jaws are separated from each other by a series of slots 16 extending lengthwise of the collet, thus forming spring fingers 17 which normally urge the jaws outwardly away from each other into open or work releasing position. When the collet is moved to the left in Fig. 1, the jaws are moved toward each other due to the wedging action in the frusto-conical bore 14 of the lathe spindle and the inclined outer faces 15 of the jaws of the collet. When the collet is moved to the right in Fig. 1, the pressure urging the jaws toward each other is released and the jaws, consequently, spring outwardly away from each other into work releasing position due to the resiliency of the spring fingers 17. In collets of this type, the slots between the jaws are not closed when the jaws grip the work, and consequently, unless seals are used in the slots between the jaws, foreign matter may enter these slots and may interfere with the proper operation of the chuck or collet or with the machine on which it is used.

In order to cooperate with my improved seals, one or both of the edge portions of the jaws facing each other are provided with a recess or recesses into which portions of the seals may enter. These recesses may be of any suitable or desired form and may conveniently be made by first drilling holes in the jaw portions of the collet extending toward the axis of the collet and preferably of a diameter considerably larger than the width of the slots, and then cutting the slots 16 so that they extend through the holes. If the slots are cut through axial portions of the holes, as in the constructions illustrated, radial recesses 20 will be left in the adjacent edge portions of the jaws and these are of arcuate cross section, and face each other. If desired, however, only one of the adjacent edge portions of the jaws facing a slot 16 may be provided with a recess, in which case, the slots may be cut to intersect peripheral portions of the holes. In the construction shown in the drawings, the holes which form the recesses in the jaws extend perpendicular to the axis of the collet, but it will be obvious that these radial holes may be at an angle to the perpendicular. Any other means for producing recesses in the jaws facing the slots may be employed.

The seals embodying this invention which are inserted into the outer portions of the slots 16 of the collet are preferably made of an elastic material impervious to the liquids used in connection with the cutting of the work and may be made of soft rubber or other rubber-like material, such as neoprene, or other synthetic rubber-like plastic materials. However, any other material capable of stopping the passage of foreign material through the slots of the chuck or collet may be used. This material is formed in strips or small sheets 21 including a web 22 which is shaped to fit into the slots between the jaws of the collet. The web is substantially flat but preferably has one or more portions thereof made of greater thickness, so as to form a seal between adjacent faces of the jaws when the same are open or separated from each other. In the construction shown in Figs. 1 to 7, the web is of greater thickness along the longitudinal center 23 of the strip, see particularly Figs. 3, 4 and 5, and the opposite faces of the strip converge outwardly so that they are wedge-shaped in cross section, being of reduced thickness at the opposite edges 24 thereof. The strip also is provided at one or both of the opposite faces thereof with an enlargement or enlargements of any suitable form to enter into the recesses in the sides of the jaws to hold the seals against displacement lengthwise of the jaws. These enlargements may, for example, be in the form of a rounded bead 25 extending centrally of the strip along the thicker portion of the web. Two such beads are shown, one on each face of the strip and which extend from one edge 26 of the strip and terminate at a distance from the opposite edge 27 thereof. These strips are preferably provided in this form in quantities, because they are adaptable for various types and sizes of collets or chucks, since the opposite sides and ends thereof may be suitably trimmed or cut off to suit the particular collet on which they are used. While the strip or sheet is provided with a web portion 22 which extends to opposite sides of the bead 25, yet it will be obvious that these strips or sheets may be made with the portion of the web beyond one side of the bead omitted.

In Figs. 1 and 2, the holes which form the recesses of the jaws are drilled completely through the jaw portions of the collet from the outer surface 15 thereof to the inner work gripping surface, and consequently, the seals 30 shown in Figs. 1 and 2 are cut to terminate at the outer inclined surface 15 of the collet with the bead portions 25 fitting into the oppositely facing recesses 20 in the jaws. The lower edge of the seal 30 is cut so as to lie substantially flush with the inner surface of the adjacent portions of the jaws 12 of the collet, as indicated at 32. In this case, the lower unbeaded portion of the strip 21 is not used.

In Fig. 6 is shown another type of collet in which the jaws 35 are spaced from each other by four slots 36 and work gripping pads 38 of a hard material are suitably secured to the inner faces of the jaws. These pads are well known in collet construction and may be secured to the jaws 35 in any suitable or well known manner. The jaws are provided with oppositely facing recesses at the edges thereof facing the slots 36 and the pads are not provided with such recesses, but are provided with relatively smooth surfaces terminating at the slots 36. The seals 40 used in this construction are formed by inserting a strip 21 into the slots 36 in such a manner that the beads 25 of the strips enter into the oppositely facing recesses in the jaws and terminate at the pads 38. The unbeaded portion of the strip 21 extends beyond the jaws and between the opposite flat edges of the pads 38. The strip 21 is then cut along the outer edge 42 so as to lie substantially flush with the outer tapered faces of the jaws 35 and the strip is then cut off at the inner surface of the jaws along the line 43 so that the seal not only seals the space between the jaws formed by the slot 36, but also seals the space between adjacent edges of the pads 38 so that liquid or foreign material cannot pass either lengthwise of the slots 36 or between the opposite edge faces of the pads 38.

In this collet, the outer frusto-conical or tapering faces of the jaws taper in the opposite direction from that shown in Fig. 1 and are adapted to cooperate with a lathe spindle or other part having a frusto-conical interior surface inclined oppositely to the surface 14 shown in Fig. 1. In this collet, the jaws are closed by pushing the collet outwardly with reference to the spindle or to the right in Fig. 6, and the jaws open when the collet is drawn to the left. My improved seals may be used with collets of either of the types shown in Figs. 1 and 6 and with collets of other types.

In Fig. 7 is shown another collet similar to the one shown in Fig. 1 except that the collet shown in Fig. 7 is formed to grip work or tools of much smaller diameter. In collets of this type, it is desirable to form oppositely facing recesses on the jaws of the collet which terminate in spaced relation to the inner faces of the jaws. In other words, if the recesses are formed by radial holes drilled in the collet jaws before the slots 50 are cut, such holes are drilled only partly through the jaws 51, this being done to prevent a material reduction in the areas of the gripping faces of the jaws 51 which engage the work. When collets are formed in this manner, strips of the sealing material are inserted into the slots 50 between the jaws so that the beaded portions 25 of the strips termintae at the inner ends of recesses in the sides of the jaws, thus leaving unbeaded portions of the strips 21 at the inner portions of the jaws, and the seal 53 is then formed by cutting off the strips 21 at the inner and outer edges 54 and 55 respectively which are substantially flush with the inner and outer faces of the jaws 51. These seals, consequently, extend throughout the radial dimensions of those parts of the slots in which the seals are contained.

A modified form of seal is shown in Fig. 8 in which the enlargements formed to enter the recesses in the edges of the jaws are in the form of beads 56 of arcuate cross section and in which the webs 57, instead of being tapered or wedge-shaped, as shown in Figs. 3 to 5, are of substantially uniform thickness, but have alternately arranged small ribs 58 and grooves 59 on the opposite faces of the webs, so that these surfaces of the webs are substantially corrugated. These ribs and grooves may be of any desired shapes, extending substantially parallel to the beads or enlargements 56. This seal may also be made in the form of strips, as shown in Fig. 3. When this seal is arranged between adjacent jaws of a collet, when the jaws are open or spaced apart, the peaks only of the ribs will contact the opposite faces of the jaws to exclude foreign matter. When the jaws are closed, the ribs will be compressed so that the material of the ribs will fill the grooves or depressions 59 between the ribs. Seals of this type have the advantage that when the jaws are open, the ribs form a plurality of barriers against the entrance of foreign material between the jaws.

The enlargements or beaded portions 25 or 56 of the seals extending into the recessed portions of the jaws, in all of the constructions described, hold the seals against displacement lengthwise of the slots in the collets and the seals are, of course, held against radial displacement by the frusto-conical bore in the lathe spindle or other member with which the collet cooperates and are held against movement toward the axes of the collets by the work or tool gripped by the collet.

In Figs. 4 and 5, I have illustrated the manner of operation of the seals. In Fig. 4, the broken lines 60 represent the edge portions of the jaws facing the slots 16, 36 or 50 of the collets, and the broken partly circular lines 61 represent the recesses in the jaws. When the jaws are open, the thickest portions of the webs of the seals adjacent to the beads 25 alone contact with the edges 60 of the jaws, as shown in Fig. 4, while other parts of the webs of the sealing strips 21 and portions of the beads 25 are spaced from the jaws, as clearly shown in Fig 4. Consequently, when the jaws are open, no foreign material can pass through the slots between the jaws. When a seal as shown in Fig. 8 is arranged between the jaws, when the jaws are open, the ribs 58 will keep out foreign material.

Since rubber and other similar elastic materials are not compressible but stretch and flow when subjected to pressures, I have provided the clearances between the seals and the jaws which are shown in Fig. 4, namely, the clearances at the portions of the webs which are of reduced thickness, and at the outer portions of the beads, which, when the jaws are open, do not extend fully into the recesses in the sides of the jaws. However, when the jaws are in closed positions, the seals assume the shape shown in Fig. 5, in which the beads 25 or 56 extend to a greater extent into the recesses in the edges of the jaws and the material in the web portions 22 or 57 is deformed out of its original shape so that the opposite faces thereof are substantially parallel to each other. By means of this construction of the strips from which the seals are made, there is a minimum flow of the material of the strips and a minimum deformation and stretching of the material so that no damage to the material results. Consequently, these seals may be used continuously for many years without deterioration.

It is very desirable that the jaws of a collet or chuck, when the same is moved into a position to permit the jaws to open or move away from each other, be positively forced apart to the maximum extent, so that the work or tool gripped by the collet has ample clearance to move lengthwise of the collet. By making these seals of elastic material in the nature of rubber, the seals, when the jaws of the collet are closed as shown in Fig. 5, exert a very substantial pressure on the jaws in a direction to urge them into open position. The seals, consequently, augment the action of the spring fingers 17 of the collets in which they are used, by greatly increasing the forces acting on the jaws to move them positively into open position. This property of the seals may be used by the designers of collets either to ensure a more positive opening of the jaws or to reduce the spring tension of the spring fingers 17 required to open the jaws. When using sealing strips of uniform dimensions, the pressure exerted by seals in a direction to open the jaws may be varied by varying the widths of the slots in the collet, or if slots of uniform widths are employed, seals of different widths may be provided. It is well known that in machines in which the collets are not positively moved in a direction to open the jaws thereof, the collets will sometimes stick and fail to open, and the compression of the seals between jaws greatly increases the ability of these collets to move into work releasing positions. The force exerted by these seals is very effective, since it acts directly on the jaws near the outer end of the collet in a direction transverse of the slots.

The term "elastic material in the nature of rubber" as herein employed is intended to include natural rubber, neoprene, or any other synthetic elastic rubber-like materials or mixtures thereof.

I claim as my invention:

1. The combination of a chuck having jaws spaced apart by slots extending longitudinally of said chuck, each of said jaws having a substantially radially extending recess in the edge portion thereof facing a slot, and a seal for each slot freely insertable into and removable from said slot and comprising a sheet of sealing material for stopping the passage of foreign material through the slot and including a web portion formed to fit into a slot of said chuck and a portion of increased thickness formed to extend into the recess of a jaw and constituting the sole means for holding said seal against displacement lengthwise of said chuck, said web portion at the part thereof adjacent said portion of increased thickness being of a thickness such as to contact opposite faces of said jaws when the same are in open position and other parts of said web portion being of lesser thickness.

2. A removable seal for a chuck having jaws spaced apart by slots extending substantially lengthwise of said chuck and in which each jaw has a recess in the edge thereof facing said slot and extending crosswise of said jaw, each of said seals comprising a sheet of compressible sealing material having a web portion fitting into a slot and a bead on said web formed to fit into said recess and constituting the sole means for holding said seal against displacement lenthwise of said chuck, parts of said web portion parallel to said head being of a thickness equal to the space between jaws when the same are open and adjacent parts of said web portion being of lesser thickness and into which material of said first mentioned parts flows when said jaws are closed.

3. A seal in accordance with claim 2 made of an elastic impervious material in the nature of rubber and having said web formed with the opposite faces thereof converging from the longitudinal center thereof toward opposite sides thereof and having said bead formed at the portion of said web of greatest thickness.

4. A seal in accordance with claim 2 made of an elastic impervious material in the nature of rubber and having said web formed with the opposite faces thereof converging from the longitudinal center thereof toward opposite sides thereof and having said bead formed at the portion of said web of greatest thickness, said bead being formed of a width sufficient to fit snugly against the edge portions of said recess in said jaw and terminating in spaced relation to the inner portion of said recess and contacting with the edge portions of said recess adjacent to said slots when said jaws of said chuck are in open position, to permit the material of said bead to flow into said inner portion of said recess when the jaws of said chuck are in closed position.

5. A seal for a chuck having jaws spaced apart by slots extending substantially longitudinally of said chuck, each of said jaws having recesses extending substantially radially with reference to the longitudinal axis of said chuck, said seal comprising a sheet of an impervious elastic material in the nature of rubber having a web portion formed to fit into said slot and having beads at opposite faces thereof formed to extend into said recesses of said jaws, said web having portions of greater thickness than adjacent portions thereof extending parallel to said beads and throughout the width of said slot, said portions of greater thickness of said web sealing said slots against the passage of foreign material therethrough when the jaws of said chuck are spaced apart in open position, and said web being compressed into a shape in which the opposite faces of said web are substantially parallel to each other when said jaws of said chuck are moved toward each other into work gripping positions.

6. A seal according to claim 5 in which said beads are of such dimensions as to extend only partly into said recesses when the jaws of said chuck are spaced apart and in open position, to permit the material of said beads to flow into said recesses when the jaws of said chuck are moved toward each other into work gripping position, said seals exerting pressure on said jaws when in closed position to urge said jaws into open position.

7. A seal for a chuck having jaws spaced apart by slots extending substantially longitudinally of said chuck, each of said jaws having recesses extending substantially radially with reference to the longitudinal axis of said chuck, from the peripheral surfaces of said jaws and terminating in spaced relation to the gripping faces of said jaws, said seals each comprising a web portion formed to fit in said slots in contact with unrecessed portions of said jaws and having a projecting bead formed to extend into said recess.

8. A strip of sealing material for use in forming seals in a slot between adjacent jaws of a chuck in which each jaw has a radially extending recess in the edge portion thereof facing said slot, said sealing strip comprising a web portion formed to fit into a slot, and a bead portion extending outwardly from said web and formed to enter a recess of a jaw and extending from one end of said strip toward the other end thereof and terminating at a distance from said other end thereof.

9. A strip of sealing material according to claim 8 characterized in that said bead is arranged substantially midway between the sides of said web.

10. A strip of sealing material for use in forming seals in a slot between adjacent jaws of a chuck in which each jaw has a radially extending recess in the edge portion thereof facing said slot, said sealing strip being made of an impervious elastic material in the nature of rubber and having a web formed to fit into a slot of a chuck and having a bead formed thereon shaped to fit into a recess in an edge portion of the jaw.

11. A strip of sealing material according to claim 10 characterized in that said sheet is provided with a web of greater thickness in the longitudinal middle portion thereof than at the sides thereof and provided with a bead at said middle portion thereof extending from one end of said sheet lengthwise of said middle portion and terminating at a distance from said other end of said sheet.

12. In a chuck having jaws separated by slots extending substantially lengthwise thereof, that improvement which comprises seals of an elastic material in the nature of rubber removably inserted into said slots when said jaws are spaced apart and which serve to prevent foreign material from passing through said slots, said seals having parts extending crosswise of said jaws and which are of sufficient thickness to contact opposite faces of said jaws when said jaws are in open positions and which are deformed when said jaws are moved toward each other and exert pressure on said jaws in a direction to move the same into their spaced apart positions, said seals having integral parts projecting from the faces thereof for cooperating with the jaws of said chuck and constituting the sole means for preventing displacement of said seals lengthwise of said collet.

HENRY A. LUNDY.

REFERENCES CITED

The following references are of record in the file of this patent:

UNITED STATES PATENTS

| Number | Name | Date |
| --- | --- | --- |
| 1,817,774 | Sipe | Aug. 4, 1931 |
| 2,032,492 | Nathan | Mar. 3, 1934 |
| 2,046,052 | Bechler | June 30, 1936 |
| 2,277,816 | Brown | Mar. 31, 1942 |
| 2,374,192 | Godfrey | Apr. 24, 1945 |

FOREIGN PATENTS

| Number | Country | Date |
| --- | --- | --- |
| 482,766 | Great Britain | Apr. 5, 1938 |